Patented Apr. 26, 1927.

1,626,104

UNITED STATES PATENT OFFICE.

ERNEST L. SWIFT, OF OAKLAND, CALIFORNIA, ASSIGNOR TO VIRGINIA SWIFT, OF OAKLAND, CALIFORNIA.

METAL-COATED ELECTRODE.

No Drawing.  Application filed February 21, 1922. Serial No. 538,388.

My invention is a metal coated electrode.

The carbon is prepared by mixing carbon and an organic binding material with a mineral acid and a halogen salt, namely, a chloride, bromide, iodide or fluoride.

They are then plated by any of the well-known methods with a coating of metal, preferably copper approximately .004" thick. They are then given a coating of metal such as brass, zinc, cadmium, nickel, cobalt or silver, Monel metal or aluminum. The second coat should be very thin. Its purpose is to give the carbons an attractive appearance and to prevent rapid oxidation of the copper and separation of the same from the carbon. A suitable electrode may be formed by electro-plating the carbon with a layer of soft copper and plating this with brass.

The fluxes in the carbon combine to liberate small quantities of halogen compounds which halogenize the metal beads making them volatile which otherwise would gather on the point of the carbon and extinguish the arc or cause a fluttering thereof. Such beads as form further down on the point of the carbon out of the intense heat of the arc are coated with the slag formed by the residual components of the fluxes so that the absorption of oxygen from the air is prevented. This is very important as otherwise the beads when chilled by running down into a cooler zone would violently expel oxygen, causing the metal to "spit" and throw particles of metal on the condenser of a projection lamp or would otherwise clutter up a lamp in which used. Such metal as is influenced by the arc and the halogen is mostly volatilized and carried away. However some of the metal forms into small beads or globules, and being fused absorb gases in accordance with the well known phenomena of the occlusion of gases by molten metals. These globules roll down the carbon and were it not that they become coated with slag from the impurities in the electrode, in the binder and from the fluxes, they would "sprout" in the same manner as an assay button. That is as the globules cool the occluded gases would be violently expelled. However my electrode functions to cause the beads to become covered with slag: and they form a coronet around the metal sheath, some dropping off. As they do not "sprout" the particles of metal are not projected from the electrode.

Having described my invention, I claim:

1. An electrode comprising a carbon consisting of carbon and a binder, a mineral acid and a halogen salt, said electrode being coated with metal in any suitable manner.

2. An electrode comprising a carbon consisting of a mixture of carbon and an organic binding material with a mineral acid and a halogen salt, coated with metal by any known method, and coated with a second thin coating of metal, the second coating being adapted to prevent rapid oxidation of the first mentioned metal.

In testimony whereof I affix my signature.

ERNEST L. SWIFT.